United States Patent
Richard

(10) Patent No.: US 7,781,042 B2
(45) Date of Patent: Aug. 24, 2010

(54) OPTICAL STORAGE MEDIUM USING NANOPARTICLES

(75) Inventor: Nicolas Richard, Dijon (FR)

(73) Assignee: Thomson Licensing, Boulogne-Billancourt (FR)

( * ) Notice: Subject to any disclaimer, the term of this patent is extended or adjusted under 35 U.S.C. 154(b) by 649 days.

(21) Appl. No.: 11/709,117

(22) Filed: Feb. 20, 2007

(65) Prior Publication Data
US 2007/0202441 A1    Aug. 30, 2007

(30) Foreign Application Priority Data
Feb. 24, 2006    (EP) .................... 06300160

(51) Int. Cl.
*B32B 3/02*    (2006.01)
(52) U.S. Cl. .................. 428/64.1; 428/64.4; 430/270.12
(58) Field of Classification Search ........................ None
See application file for complete search history.

(56) References Cited

U.S. PATENT DOCUMENTS

2004/0035940 A1    2/2004    Richard
2004/0161575 A1*   8/2004    Hwang et al. .............. 428/64.8
2006/0114801 A1*   6/2006    Cioc et al. ................ 369/275.1

FOREIGN PATENT DOCUMENTS

EP          0 186 506            7/1986

OTHER PUBLICATIONS

European Search Report dated Jul. 6, 2006.
Stephan Link and Mostafa A. El-Sayed: "Spectral Properties and Relaxation Dynamics of Surface Plasmon Electronic Oscillations in Gold and Silver Nanodots and Nanorods" J. Phys. Chem. B, vol. 103, No. 40, 1999, pp. 8410-8426 XP002389016.

* cited by examiner

*Primary Examiner*—Elizabeth Mulvaney
(74) *Attorney, Agent, or Firm*—Robert D. Shedd; Jeffrey M. Navon

(57)    ABSTRACT

The present invention relates to an optical storage medium using nanoparticles, and more specifically to a multi-layer optical storage medium.

According to the invention, the optical storage medium has two or more storage layers with nanoparticles, each storage layer being made of a dielectric material, wherein the dielectric materials of at least two storage layers have a different dielectric permittivity.

10 Claims, 2 Drawing Sheets

OPTICAL STORAGE MEDIUM USING NANOPARTICLES

This application claims the benefit, under 35 U.S.C. §119 of European Patent Application 06300160.6, filed Feb. 24, 2006.

FIELD OF THE INVENTION

The present invention relates to an optical storage medium using nanoparticles, and more specifically to a multi-layer optical storage medium.

BACKGROUND OF THE INVENTION

Digital data are conventionally stored on optical storage media as binary data in the form of information elements, e.g. as pits. These elements are generally distributed over one or more plane surfaces within the medium, called information layers. In the case of a conventional optical disk, e.g. a Compact Disk (CD), Digital Versatile Disk (DVD), or BluRay Disk (BD), the information elements of the same layer are distributed in a spiral track or concentric circular tracks.

The maximum storage density on an information layer is limited by the minimum size of the information elements and by the minimum distance between adjacent tracks. In practice, in order to be able to read the stored data by conventional optical detection means, this minimum size and distance are determined by the wavelength of the light used for the optical detection.

To overcome the limitation of the storage density, a spectrally coded data storage has been proposed. For example, JP05-062239 discloses a storage medium for multiple wavelength storage. The storage medium has a layer of an amorphous matrix in which nanoparticles with different sizes are distributed. The different sizes lead to different resonance frequencies.

The article entitled "Spectrally coded optical data storage by metal nanoparticles" by H. Diltbacher et al., Review Optics Letters, Vol. 25, No. 8, 1995, pages 563-565, indicates that the use of non-linear optical technologies affords solutions to increase the storage density of a storage layer. The authors stipulate that, if the spectral composition of the light scattered by an information element can be made dependent on a parameter relating to the information element, such as the shape, the amount of information carried by an information element and as a result the optical storage density would be increased. To this end, the document teaches arranging, on a medium or surface that is used for storage, metal particles of sizes less than that of the wavelength of the light, and of different size and/or shape and/or orientation.

Thus, when this surface is suitably illuminated, resonant modes of groups of electrons, called "localized plasmons", are excited within the metal nanoparticles, which causes absorption of certain wavelengths of the incident radiation. Since the excitation of these resonant modes depends on the shape, the orientation and the distribution of the nanoparticles, this leads to spectrally coded or "polychromatic" data storage. Using the "polychromatic" storage method, the maximum storage density is noticeably increased by a factor of about five compared to the conventional "monochrome" optical storage modes.

More specifically, according to the article silver nanoparticles are deposited on a transparent substrate using a cathodo-lithographic process. In order to optically read data stored in this coating, a localized electron plasma is excited within the nanoparticles by means of an evanescent electromagnetic field obtained by total internal reflection of radiation incident on the surface of the substrate. For calculating the amplitude of the plasmon resonance, the intensity of the light scattered by this surface is measured as a function of the wavelength using conventional optical detection means.

SUMMARY OF THE INVENTION

It is an object of the invention is to propose an alternative optical storage medium using nanoparticles.

According to the invention, this object is achieved by an optical storage medium having two or more storage layers with nanoparticles, wherein at least two of the storage layers have a different dielectric permittivity.

The invention allows to realize various modes of data storage by means of metal nanoparticles arranged in dielectric storage layers of an optical storage medium. The nanoparticles are preferably made from noble metals, e.g. Gold (Au), Silver (Ag), or Copper (Cu). Of course, other materials like Aluminum and mixed Indium and Tin oxide can likewise be used. The dimensions of the nanoparticles are smaller than the wavelength of the radiation interacting with the nanoparticles. Preferably, the dimensions are smaller than or equal to 200 nm, e.g. 100 nm×100 nm×40 nm. The depth ($p1$, $p2$, $p3$ etc.) of the nanoparticles within the storage layers can be different for each storage layer. The excitation wavelengths of the metal nanoparticles depend on the plasmon resonance and are adjusted by an appropriate choice of the particle size and material as well as the dielectric permittivity of the surrounding medium. Using light of the correct wavelength and/or focusing the reading light into the desired storage layer allows to select a specific storage layer for reading.

According to a first aspect of the invention, the size and material of the nanoparticles as well as the dielectric permittivity of the surrounding medium of the selected layer are chosen such that all storage layers use the same excitation wavelength. This single wavelength mode has the advantage that for reading only a single light source emitting a single wavelength is necessary. This greatly simplifies the setup of an apparatus for reading from such an optical storage medium.

For addressing a specific layer it is sufficient to focus the reading light into the desired layer. At the same time coupling effects between the nanoparticles, which could modify the excitation wavelength, and thus between the various storage layers, are avoided.

According to a second aspect of the invention, the size and material of the nanoparticles as well as the dielectric permittivity of the surrounding medium of the selected layer are chosen such that all storage layers use a different excitation wavelength. This multi-wavelength mode makes it necessary to use multiple light sources or a single light source emitting multiple wavelengths in an apparatus for reading from such an optical storage medium. Also in this case no coupling between the nanoparticles and thus between the various storage layers occurs. However, the selectivity for a specific storage layer is further increased, as the nanoparticles in the unaddressed storage layers are not excited by the reading light.

While in the prior art only the size of the nanoparticles is adjusted for achieving polychromatic storage, according to the present invention both the size and the dielectric permittivity of the surrounding medium of the selected layer are adjusted. Size and the dielectric permittivity are chosen such that an electron plasma resonance is obtained for at least one wavelength used for reading. The excitation wavelength in fact generally is a fairly wide range of wavelengths centered on a peak where the resonance is maximum. Preferably, the various excitation wavelengths are between 350 nm and 1100 nm.

An apparatus for reading from an optical storage medium according to the invention includes means for addressing a specific storage layer of the optical storage medium. In case of an optical storage medium with multiple excitation wavelengths, addressing is preferably achieved by selecting an appropriate wavelength for reading, which is focused into the selected storage layer. In case of an optical storage medium with multiple layers but a single excitation wavelength, addressing is advantageously achieved by focusing the reading light into the selected storage layer.

An optical storage medium according to the invention is preferably produced by depositing metallic particles on a substrate, depositing a first dielectric layer on the substrate, depositing metallic particles on the first dielectric layer, and depositing a second dielectric layer on the first dielectric layer. Further layers are produced in the same way. The metallic particles may for example be deposited by nanolithography using masks. The dielectric layer may be deposited by epitaxy or by sol gel technology. Of course, other methods of deposition may be employed for the metallic particles and the dielectric layers as well. In case the storage medium uses intermediate layers, such layers are deposited before depositing the metallic particles of the next storage layer.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

The invention makes use of the properties, e.g. resonance plasmon, excitation wavelength, of the metal nanoparticles in the multiple dielectric storage layers. This allows to avoid the coupling effects between the nanoparticles and thus between the various layers. A coupling between two close particles would modify the excitation wavelength. Basically two types of optical storage media are possible.

Figure 1:
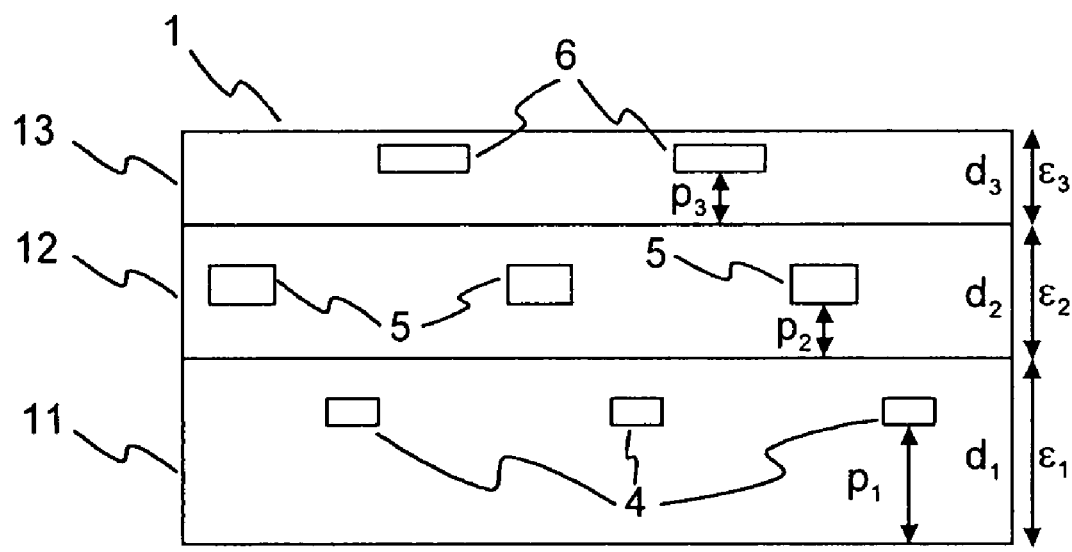
FIG. 1 shows an optical storage medium according to a first aspect of the invention.

A first type of optical storage medium is depicted in FIG. 1. The exemplary optical storage medium 1 has three storage layers 11, 12, 13 with different permittivities $\in_1$, $\in_2$, and $\in_3$ and different thicknesses $d_1$, $d_2$, and $d_3$. The nanoparticles 4, 5, 6 in the different storage layers 11, 12, 13 are located at different depths $p_1$, $p_2$, and $p_3$ within the storage layers 11, 12, 13. The size and material of the nanoparticles as well as the dielectric permittivity of the surrounding media of the layers are selected such that the excitation wavelength is the same for all storage layers 11, 12, 13. The size of the nanoparticles 4, 5, 6 is essentially constant within a storage layer 11, 12, 13. Likewise, the material of the nanoparticles 4, 5, 6 is the same within a storage layer 11, 12, 13.

Figure 2:
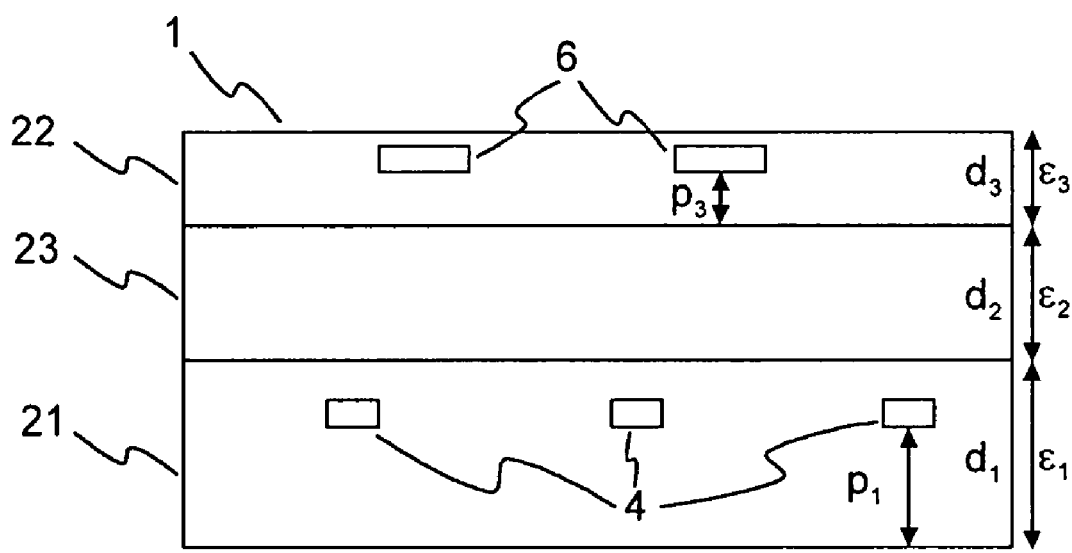
FIG. 2 depicts an optical storage medium according to a second aspect of the invention.

A second type of optical storage medium is depicted in FIG. 2. In this case only two storage layers 21, 22 are provided, which are separated by a separation layer 23. The separation layer 23 serves as a protective layer. It may also be used to adjust the plasmon resonance wavelength of a given layer. The size and material of the nanoparticles as well as the dielectric permittivity of the surrounding media of the storage layers 21, 22 are selected such that the excitation wavelength is different for all storage layers 21, 22. Again, within a storage layer 21, 22 the size of the nanoparticles 4, 6 is essentially constant in a selected layer and only one type of material of the nanoparticles 4, 6 is used.

Of course, it is likewise possible to use a combination of both storage modes, i.e. some storage layers have the same excitation wavelength while other storage layers have different excitation wavelengths. In addition, within a storage layer different sizes and materials of nanoparticles may be used. The separation layer 23 shown in FIG. 2 is not mandatory for the second type of storage medium. Different excitation wavelengths can likewise be used without providing a separation layer 23. Furthermore, the separation layer 23 can also be used in combination with the first type of storage medium depicted in FIG. 1.

Figure 3:
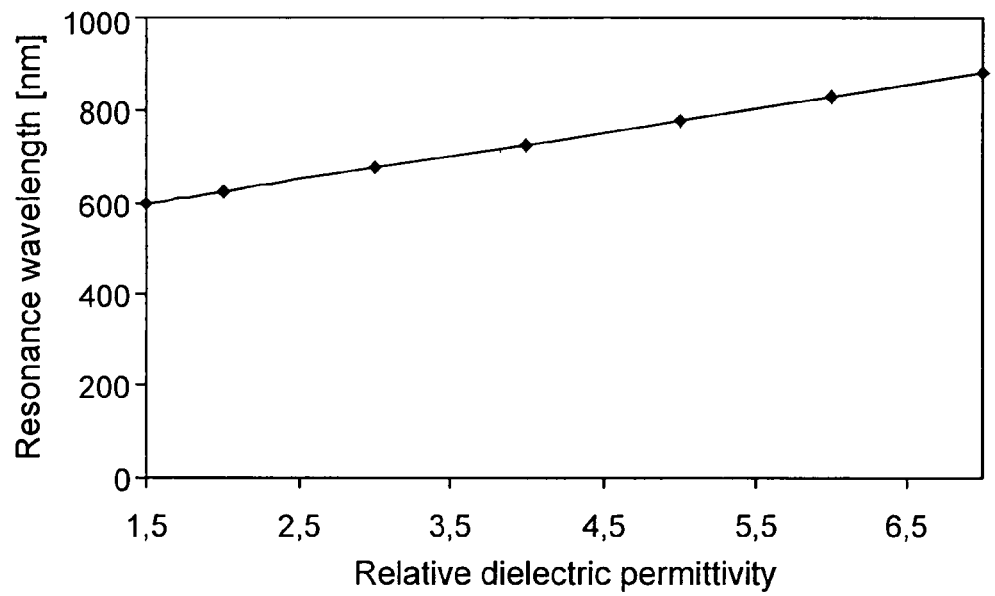
FIG. 3 shows an example of the dependence of the resonance wavelength on the dielectric permittivity of the surrounding medium.
Figure 4:
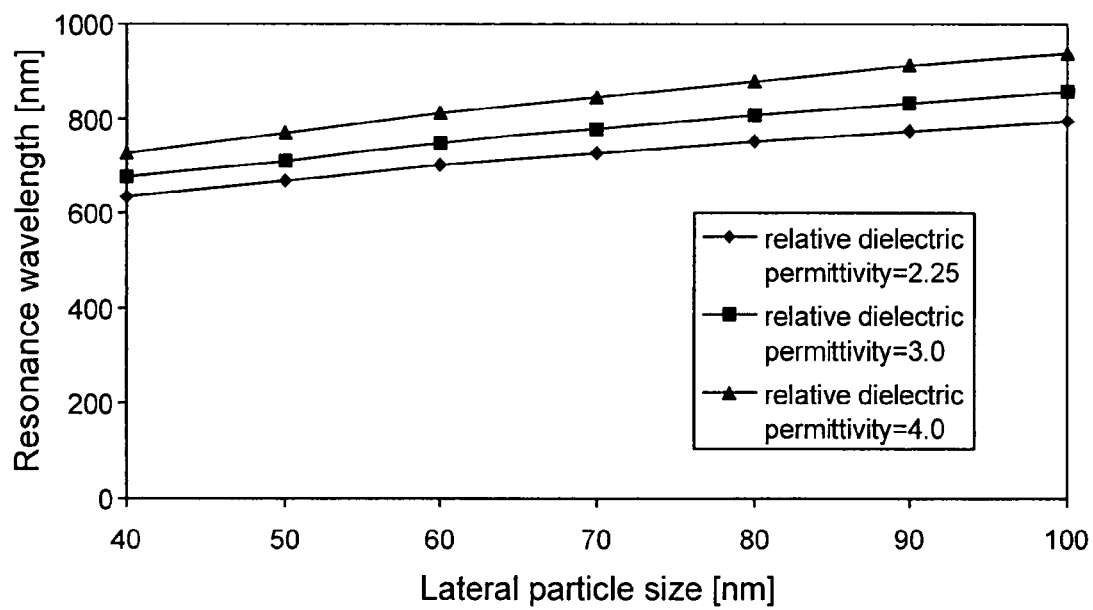
FIG. 4 depicts exemplary curves of the dependence of the resonance wavelength on the lateral particle size for three different dielectric permittivities.

FIG. 3 shows as an example the dependence of the resonance wavelength on the relative dielectric permittivity of the surrounding medium for a Gold nanoparticle. The nanoparticle was approximated by a cuboid with the dimensions 40 nm×40 nm×100 nm. As can be seen, for this material the resonance wavelength increases with increasing relative dielectric permittivity.

The dependence of the resonance wavelength of a Gold nanoparticle on the lateral particle size is depicted for three exemplary relative dielectric permittivities. Again the nanoparticle was approximated by a cuboid. Two dimensions of the nanoparticle were fixed at 40 nm×100 nm, the third dimension was varied from 40 nm to 100 nm. It can be seen that, as in FIG. 3, for a given lateral particle size the resonance wavelength increases with increasing relative dielectric permittivity. Furthermore, for a given relative dielectric permittivity the resonance wavelength increases with increasing lateral particle size.

What is claimed is:

1. Optical storage medium having at least a first storage layer with nanoparticles and a second storage layer with nanoparticles, each storage layer being made of a dielectric material, wherein the dielectric material of the first storage layer has a different dielectric permittivity than the dielectric material of the second storage layer.

2. Optical storage medium according to claim 1, wherein the nanoparticles in different storage layers are made of different materials.

3. Optical storage medium according to claim 1, wherein the size of the nanoparticles within a storage layer is essentially constant.

4. Optical storage medium according to claim 1, wherein the size and material of the nanoparticles and the permittivities of the dielectric materials of the storage layers are chosen such that the excitation wavelength of the nanoparticles is the same for at least two storage layers.

5. Optical storage medium according to claim 1, wherein the size and material of the nanoparticles and the permittivities of the dielectric materials of the storage layers are chosen such that the excitation wavelengths of the nanoparticles are different for at least two storage layers.

6. Optical storage medium according to claim 1, wherein the nanoparticles are made of noble metals.

7. Optical storage medium according to claim 1, wherein the size of the nanoparticles is smaller than or equal to 200 nm.

8. Optical storage medium according to claim 1, wherein the excitation wavelength of the nanoparticles is between 350 nm and 1100 nm.

9. Method for producing an optical storage medium using nanoparticles, having the steps of:

depositing nanoparticles on a substrate,
depositing a first dielectric layer having a first dielectric permittivity on the substrate,
depositing nanoparticles on the first dielectric layer, and
depositing a second dielectric layer having a second dielectric permittivity different from the first dielectric permittivity on the first dielectric layer.

10. Method according to claim 9, further having the step of depositing an intermediate layer on the first dielectric layer.

* * * * *